N. JONES.
Improvement in Feed-Water Heaters.
No. 132,585. Patented Oct. 29, 1872.
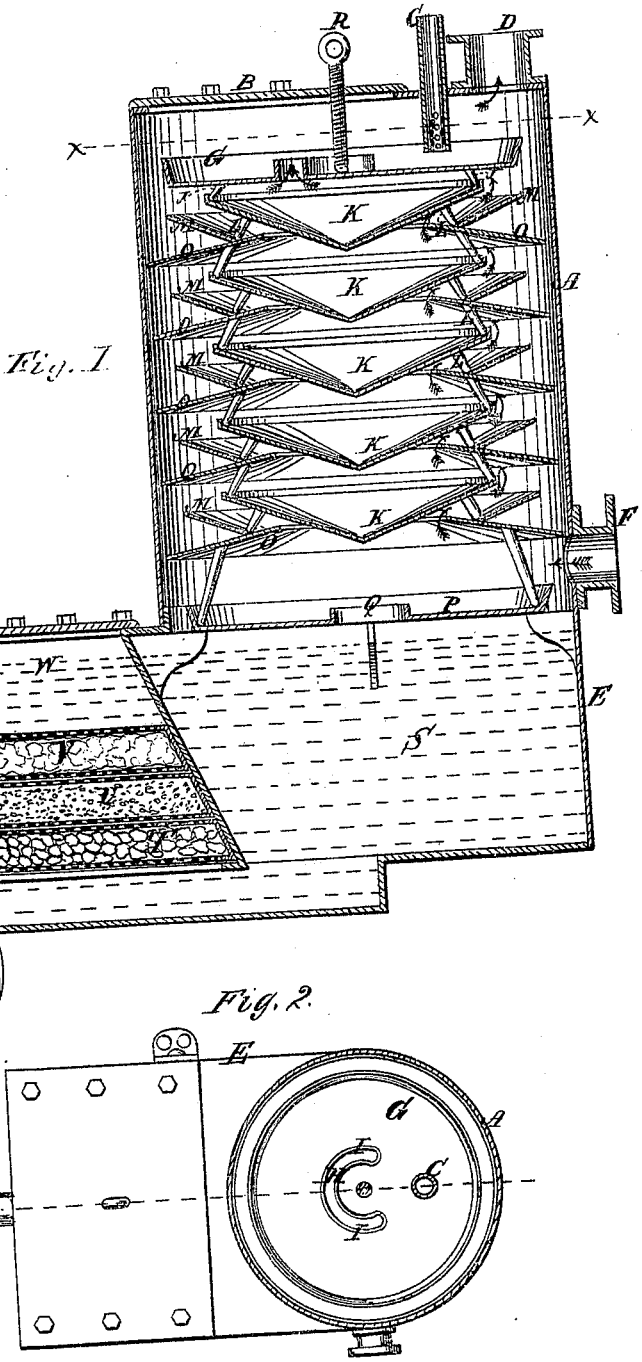
Fig. 1.
Fig. 2.
Witnesses:
E. Wolff
Alex F. Roberts
Inventor:
N. Jones
per 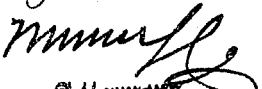
Attorneys.

UNITED STATES PATENT OFFICE.

NATHANIEL JONES, OF BUFFALO, NEW YORK.

IMPROVEMENT IN FEED-WATER HEATERS.

Specification forming part of Letters Patent No. 132,585, dated October 29, 1872.

*To all whom it may concern:*

Be it known that I, NATHANIEL JONES, of Buffalo, in the county of Erie and State of New York, have invented a new and Improved Feed-Water Heater, of which the following is a specification:

My invention relates to the class of feed-water heaters consisting, in general terms, of a series of pans or troughs arranged with a series of heat-radiators within a case, so that the water in flowing downward falls from the first series of troughs onto the radiators next below them, and from the radiators onto the troughs in the next series, thus alternating till the final receptacle is reached. My invention has for its object to furnish a heater in which the water-pans and steam and water guides are arranged to secure the speediest utilization of a given amount of heat with the least complicated and expensive construction of the apparatus.

Figure 1 is a sectional elevation of my improved feed-water heater, and Fig. 2 is a horizontal section taken on the line $x\ x$ of Fig. 1.

Similar letters of reference indicate corresponding parts.

A is a cylindrical vertical case inclosed at the top by a removable cover, B, and having an inlet-pipe, C, for water, and an exhaust-pipe, D, for steam in said top. The lower end is attached to and opens into one end of an elongated case, E, and has a pipe, F, attached to the side for admitting the exhaust steam from the engine for heating the water. G is a shallow flat pan in the upper part of the case A, nearly as large as the internal diameter of the case, with a semicircular opening, H, near the center, surrounded by a curb, I, nearly as high as the rim of the pan, so that a certain depth of water will be retained in it. This pan rests on the short legs J in the top of a smaller pan, K, in the form of a flat cone inverted, which rests on short legs L, upon the lower edge of an annular conical water-guide, M, which at the outer edge projects sufficiently beyond the periphery of pan K to receive the water which is to flow or drip over the rim of pan K, and discharge it into another pan below, similar to K. The lower edge of this water-guide joins onto the side of an ascending annular steam-guide, O, a short distance below the upper end, and thereby forms an annular cavity in which the water lodges, to be retained and exposed to the heat of the steam, both above and below. This steam-guide has a large opening at the center, through which the conical pan above projects, but does not quite touch it, leaving an annular space between for the steam to pass up close to the under side of the pan, which thereby becomes a guide for the steam. This guide O descends from the center to the wall of the case A, so as to prevent the steam from ascending between it and said case and direct it all against the pan, so that the action is very efficient on both sides of the water. A series of these pans K, water-guides M, and steam-guides O, is arranged between the aforesaid top flat pan G and the induction-pipe F, all arranged and supported as above described, and under the whole is another flat pan, P, which holds the water for awhile subject to the steam on its upper surface. A sufficient number of pans and guides will be used to insure such application of the steam to the water as will heat it sufficiently; but with this arrangement it is believed the requisite heat will be obtained with a smaller number and in less vertical space than with any other arrangement, owing to the more perfect and intimate contact of the steam with the water caused by it. The pans and guides are held fast by a clamp-screw, R. From the lowermost flat pan P, the water escapes through the central passage Q to the chamber S below, in one end of the case E, where it is allowed to stand for awhile, so that the foreign matters may settle to the bottom; and from this chamber it flows under a filter composed of three or more sections, T U V, of gravel and sponge, or other suitable filtering substance confined in wire-gauze or other suitable cases, so arranged that they can be readily taken out for cleaning or other purposes. Each succeeding section from the bottom up contains finer material than the one below, to graduate the action to the condition of the water. W is another water-chamber, above the filter, from which the heated and purified water is drawn through a pipe, X, by a pump or other suitable means, to be forced into the boiler. Y is a vent-pipe, attached to pipe X in advance of the pump, to allow the steam, gas, and air, to escape from the water, so that the pump will work better.

Having thus described my invention, I claim as new and desire to secure by Letters Patent—

1. The inverted conical pans K, in combination with the water-guides M and steam-guides O, said guides being connected together and open at the center to receive the pans K, as shown and described.

2. The screw R, pans G and P, and the pans K and guides M O provided with legs, all arranged within the case A, as shown and described, for the purpose specified.

3. In combination with the elements of above claims, the sectional filter, substantially as specified.

NATHANIEL JONES.

Witnesses:
 JNO. A. BELL,
 JNO. H. MOORE.